(12) United States Patent
Chu et al.

(10) Patent No.: US 10,187,905 B2
(45) Date of Patent: Jan. 22, 2019

(54) TARGET WAKE TIME (TWT) SCHEDULING FOR ORTHOGONAL FREQUENCY-DIVISION MULTIPLE ACCESS (OFDMA) CHANNELIZATION

(71) Applicant: Marvell World Trade Ltd., St. Michael (BB)

(72) Inventors: Liwen Chu, San Ramon, CA (US); Lei Wang, San Diego, CA (US); Hongyuan Zhang, Fremont, CA (US); Jinjing Jiang, San Jose, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 142 days.

(21) Appl. No.: 15/191,441

(22) Filed: Jun. 23, 2016

(65) Prior Publication Data

US 2016/0381704 A1    Dec. 29, 2016

Related U.S. Application Data

(60) Provisional application No. 62/183,838, filed on Jun. 24, 2015, provisional application No. 62/259,212, filed on Nov. 24, 2015.

(51) Int. Cl.
| | |
|---|---|
| *H04W 74/04* | (2009.01) |
| *H04W 52/02* | (2009.01) |
| *H04L 1/18* | (2006.01) |

(52) U.S. Cl.
CPC ....... *H04W 74/04* (2013.01); *H04W 52/0216* (2013.01); *H04W 52/0229* (2013.01);
(Continued)

(58) Field of Classification Search
CPC ............. H04W 74/04; H04W 52/0216; H04W 52/0229; Y02B 60/50
See application file for complete search history.

(56) References Cited

U.S. PATENT DOCUMENTS

| | | | |
|---|---|---|---|
| 2012/0051312 A1* | 3/2012 | Noh | H04W 76/023 370/329 |
| 2014/0071873 A1 | 3/2014 | Wang | |

(Continued)

FOREIGN PATENT DOCUMENTS

| | | |
|---|---|---|
| WO | WO2015031466 A1 | 3/2015 |
| WO | WO2015035945 A1 | 3/2015 |
| WO | WO2015081132 A1 | 6/2015 |

OTHER PUBLICATIONS

IEEE P802.11ah/D2.0: "Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation", Jun. 2014, 562 pages.

(Continued)

*Primary Examiner* — Kiet Tang

(57) ABSTRACT

Systems and techniques relating to wireless networking, and target wake time (TWT) scheduling for transmissions employing an Orthogonal Frequency-Division Multiple Access (OFDMA) digital modulation channelization include: receiving a frame at a wireless device, wherein a format of the frame comprises (i) a field indicating a target wake time, (ii) a first subfield having a first value that indicates a digital modulation channelization scheme, and (iii) a second subfield having a second value that indicates a transmission direction; and powering on the wireless device at the target wake time indicated by the field in the frame, wherein the powering on the wireless device enables (Continued)

the wireless device to transmit additional frames via a wireless channel based on (i) the first value set in the first subfield of the frame and (ii) the second value set in the second subfield of the frame.

20 Claims, 8 Drawing Sheets

(52) U.S. Cl.
CPC ...... *Y02D 70/1242* (2018.01); *Y02D 70/1262* (2018.01); *Y02D 70/142* (2018.01); *Y02D 70/144* (2018.01); *Y02D 70/166* (2018.01)

(56) References Cited

U.S. PATENT DOCUMENTS

| | | | | |
|---|---|---|---|---|
| 2014/0112225 | A1* | 4/2014 | Jafarian | H04W 52/0235 370/311 |
| 2015/0063190 | A1 | 3/2015 | Merlin | |
| 2015/0173012 | A1* | 6/2015 | Seok | H04W 52/0216 370/311 |
| 2016/0219510 | A1* | 7/2016 | Asterjadhi | H04W 52/0274 |
| 2017/0230149 | A1* | 8/2017 | Wang | H04L 1/1819 |

OTHER PUBLICATIONS

Khorov et al., "A survey on IEEE 802.11ah: An enabling networking technology for smart cities", Computer Communications, vol. 58, Sep. 3, 2014, pp. 53-69.

Matthew Fischer, IEEE P802.11-14/0396r0, LB200 Proposed Resolutions for Subclause 9.41, Dec. 27, 2013, pp. 1-42.

Minyoung Park, IEEE 802.11-13/0500r0, Proposed TGah Draft Amendment, May 9, 2013, pp. 1-311.

Yongho Seok, IEEE 802.11-14/0257r1, LB 200 clause 8 miscellaneous comment resolution, Feb. 26, 2014, pp. 1-38.

International Application No. PCT/IB2016/053760, Notification of Transmittal of the International Search Report and the Written Opinion of the International Searching Authority, dated Nov. 18, 2016, 22 pages.

Liwen Chu et al., "Basic Service Set Color Identifier", Patent Application MP6099, 2016, 39 pages.

Minyoung Park, "IEEE P802.11 Wireless LANs", TGac Spec Framework, doc.: IEEE 802.11-yy/xxxxr06, Mar. 2012, pp. 1-13.

International Application No. PCT/IB2016/053760, Invitation to Pay Additional Fees, dated Aug. 25, 2016, 8 pages.

\* cited by examiner

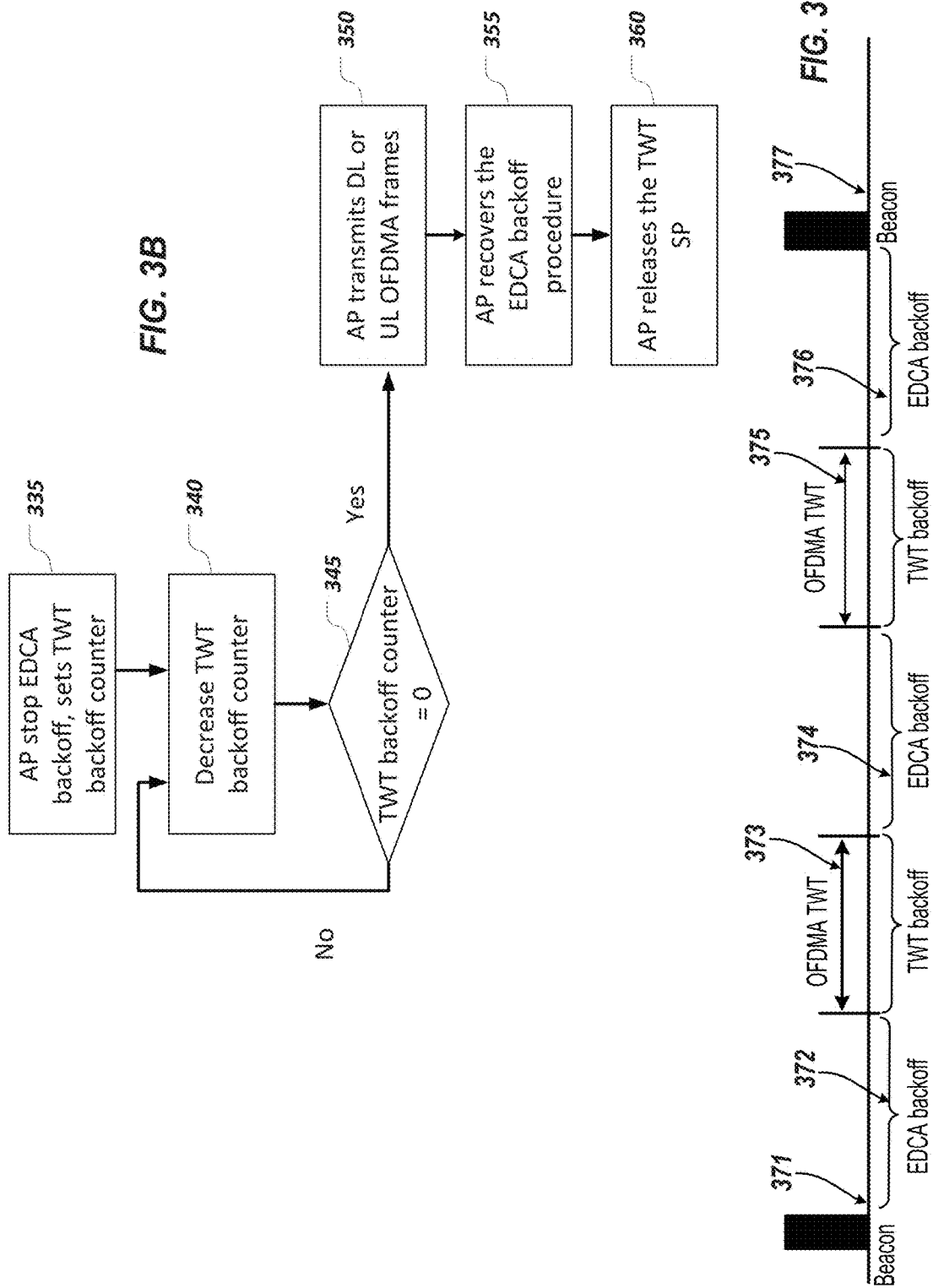

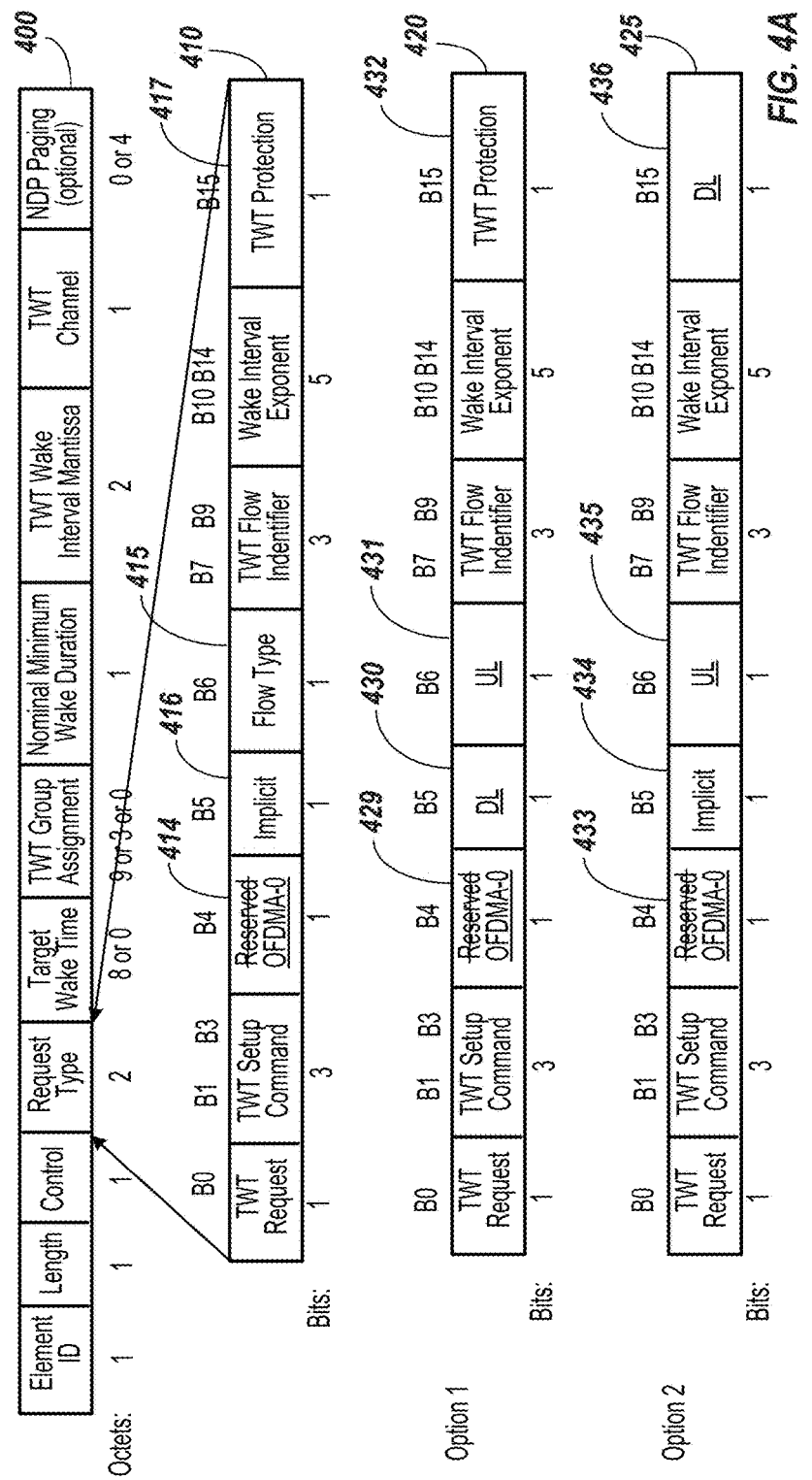

TARGET WAKE TIME (TWT) SCHEDULING FOR ORTHOGONAL FREQUENCY-DIVISION MULTIPLE ACCESS (OFDMA) CHANNELIZATION

CROSS REFERENCE TO RELATED APPLICATION

This disclosure claims the benefit of the priority of U.S. Provisional Application Ser. No. 62/183,838, filed Jun. 24, 2015, entitled, "OFDMA TWT", and also the benefit of the priority of U.S. Provisional Application Ser. No. 62/259,212, filed on Nov. 24, 2015, entitled "OFDMA TWT", which are incorporated herein by reference in their entirety.

BACKGROUND

This disclosure relates to wireless networking, namely target wake time (TWT) scheduling for transmissions employing an Orthogonal Frequency-Division Multiple Access (OFDMA) digital modulation channelization. The techniques disclosed within this disclosure can also be used in wireless networks that employ multi-user multiple input, multiple output (MU MIMO) and/or other wireless communication techniques mentioned herein.

Wireless communication, particularly wireless local area network (WLAN) technology, has become ubiquitous in the mobile computing environment. Some existing wireless networking standards, for example, WiFi protocol IEEE (Institute of Electrical and Electronics Engineers) 802.11 provide TWT scheduling mechanisms utilized for implementing access control aspects within wireless communications systems. However, the increased usage of wireless network products, and the associated wireless communication standards, has propelled a shift in the demand for wireless devices that operate using a wide range of wireless communication techniques. For example, wireless communications systems can employ differing access methods using various multiplexing techniques that provide communications services to multiple users in a multiple-bandwidth wired or wireless medium. Access methods can allow many users to share limited channels. Thus, providing TWT scheduling techniques that are interoperable in access or multiplexing methods, such as frequency division multiple access (FDMA), time division multiple access (TDMA), code division multiple access (CDMA), orthogonal frequency division multiple access (OFDMA), multi-user multiple input, multiple output (MU MIMO), and spatial division multiple access (SDMA) may be desirable.

SUMMARY

This disclosure relates to wireless networking, namely target wake time (TWT) scheduling for transmissions employing an Orthogonal Frequency-Division Multiple Access (OFDMA) digital modulation channelization and multi-user multiple input, multiple output (MU MIMO). The systems and techniques described herein can facilitate the use of TWT mechanisms in wireless communication systems employing OFDMA and MU MIMO access methods and/or multiplexing techniques. In the following description, the OFDMA access method can be replaced by MU MIMO access method—i.e., although the following description is discussed in connection with the OFDMA access method, other access methods can be used such as MU MIMO.

According to an aspect of the described systems and techniques, a method includes: receiving a frame at a wireless device, wherein a format of the frame comprises (i) a field indicating a target wake time, (ii) a first subfield having a first value that indicates a digital modulation channelization scheme, and (iii) a second subfield having a second value that indicates a transmission direction; and powering on the wireless device at the target wake time indicated by the field in the frame, wherein the powering on the wireless device enables the wireless device to transmit additional frames via a wireless channel based on (i) the first value set in the first subfield of the frame and (ii) the second value set in the second subfield of the frame.

According to an aspect of the described systems and techniques, a wireless communication device includes: one or more antennas; transceiver electronics; and processor electronics programmed to: detect, at the start of a target wait time service period (TWT SP), whether a wireless channel is idle; upon detecting that the wireless channel is idle, transmit one or more frames via the wireless channel using the one or more antennas and the transceiver electronics; determine whether collision has occurred during transmitting on the wireless channel; and upon determining that collision has occurred, suspend operation of a first backoff procedure at a starting state and initiating a counter for a second backoff procedure.

According to an aspect of the described systems and techniques, a system includes: a wireless local area network (WLAN); at least one wireless station (STAs) communicatively coupled with the WLAN; and an access point (AP) communicatively coupled with the WLAN and programmed to transmit a frame via a broadcast signal to the at least one STA, wherein a format of the frame comprises a first field indicating a target wake time (TWT), a second field indicating a downlink transmission, a third field indicating an uplink transmission; a fourth field indicating contention; and a fifth field indicating a number of repeated TWT service periods (SP).

The described systems and techniques can result in one or more of the following advantages. Implementing target wake time (TWT) scheduling for transmissions employing an OFDMA channelization can minimize contention that may be experienced in a wireless channel. The TWT OFDMA techniques of the implementations can further realize a reduction in the required amount of time that wireless devices needs to be awake during TWT procedures, thereby increasing power saving. The described systems and techniques can employ media access rules that may be more suitable for OFDMA channelization, thereby increasing interoperability with communication systems using OFDMA multiplexing methods. The TWT OFDMA implementations can employ various frame formatting techniques which reuse, remove, or reduce information and/or fields included in some exiting TWT element formats, thereby implementing capabilities (e.g., aggregation, direction indication) that can improve, or otherwise optimize, wireless communications and/or use of the wireless medium. The TWT OFDMA techniques described can improve reliability in transmitting TWT information between wireless devices, and reduce the potential of loss or damaged TWT scheduling information.

BRIEF DESCRIPTION OF THE DRAWINGS

FIGS. 3A-3C show an example of a process employed for implementing medium access techniques in OFDMA TWT.

FIG. 4A shows examples of other OFDMA TWT element formats.

FIG. 4B shows an example of a short PS-Poll frame employed in OFDMA TWT.

Like reference symbols in the various drawings indicate like elements.

DETAILED DESCRIPTION

Figure 1:
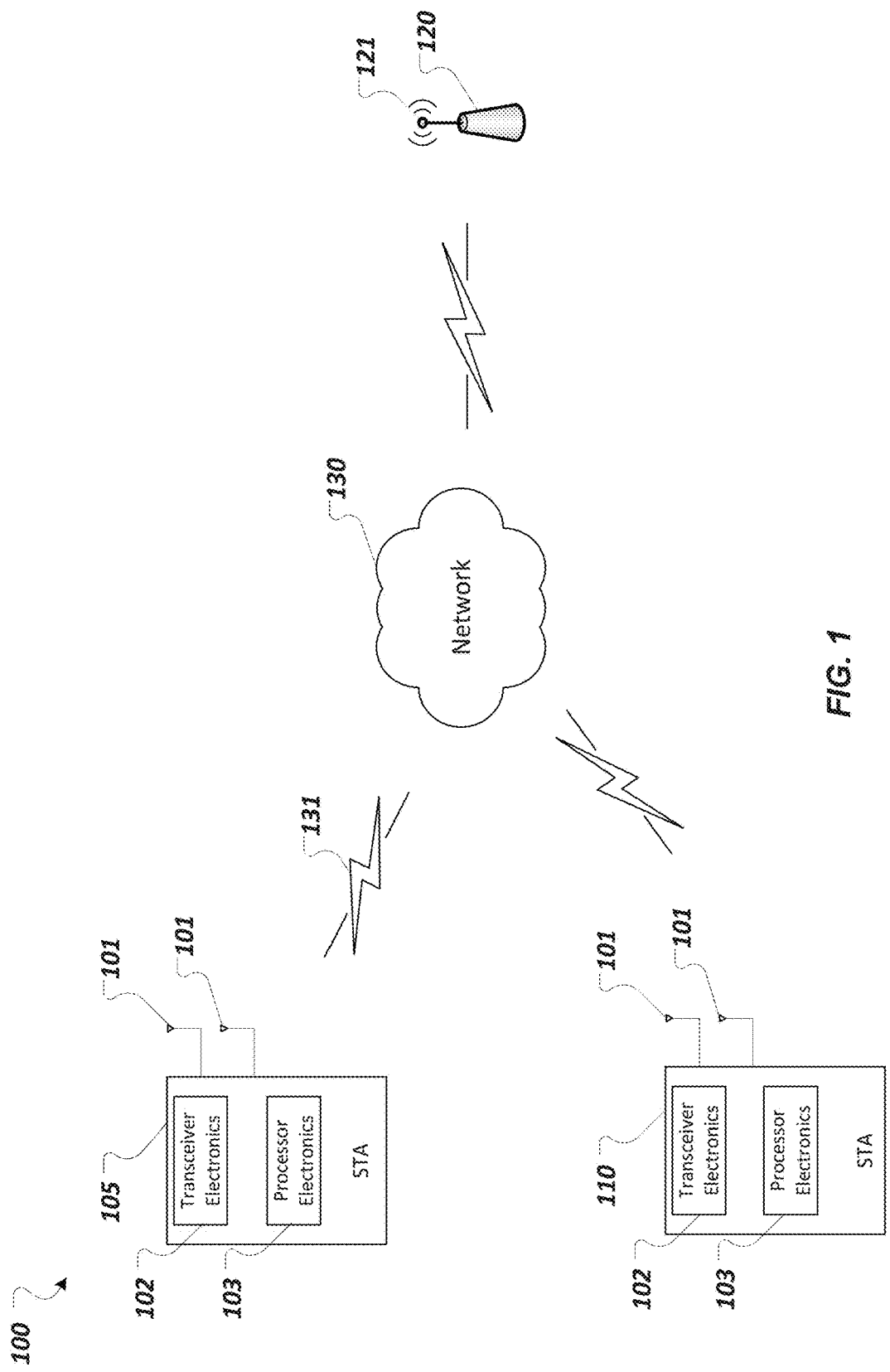
FIG. 1 shows an example of a wireless communication system.

This disclosure provides details and examples wireless networking technologies, including TWT scheduling for transmissions employing an OFDMA digital modulation channelization. In the following description, the OFDMA medium access method can be replaced by MU MIMO medium access method. FIG. 1 shows an example of a wireless communication system 100 including a wireless network 130. According to the implementations, the wireless network 130 is implemented as a WLAN. As an example, the wireless communication system 100 is implemented as a basic service set (BSS) architecture according to IEEE 802.11 communication standard. The wireless communication system 100 can be employed to provide wireless connectivity for stationary, portable, and mobile devices within accessible range to establish wireless communication links 131, or channels, supported by the wireless network 130. The wireless communication system 100 includes components that interact with one another in order to provide an over-the-air (OTA) interface between wireless stations (STAs) 105, 110 and access point (AP) 120. The AP 120 can be implemented as a wireless networking device including an antenna 121 to communicate with wireless devices, such as STAs 105, 110 and other components of the wireless network 130.

The STAs 105, 110 can each be a wireless communication device that includes circuitry that can be understood in two main parts: transceiver electronics 102 to send and receive wireless signals over one or more antennas 101; and processor electronics 103 to effect the wireless communications using the transceiver electronics 102. In some implementations, the STAs 105, 110 include dedicated circuitry configurations for transmitting and dedicated circuitry configurations for receiving. In addition, the processor electronics 103 of STAs 105, 110 can include one or more processors, such as a digital baseband processor and one or more additional dedicated processing units (e.g., a power management unit and audio codec). As an example, the processor electronics can include a Digital Signal Processor (DSP), a MicroController Unit (MCU), and at least one memory device to hold data and potentially instructions for the MCU. The transceiver electronics 102 of STAs 105, 110 can possess the components, circuitry, and architecture necessary to support various wireless communication functions, for example transmitting and/or receiving information via WiFi networking technology.

AP 120 can be connected to additional network devices, such as routers and modems, for example, operating to further connect wireless devices to a wide area network (WAN), such as the Internet. The AP 120 can be employed to register STAs 105, 110, thereby allowing the wireless devices to receive wireless communication services. As shown in FIG. 1, the system 100 includes a set of wireless stations (STAs) 105, 110 that can be controlled by a configuration function that determines when a station can transmit and/or receive information via the network 130. In some implementations, AP 120 implements direct communication between the STAs 105, 110, such as point-to-point communication, where a channel is allocated for the devices to communicate directly. The STAs 105, 110 can communicate with one or more other wireless communication devices and/or the AP 120 using one or more antennas 101 and one or more wireless transmission technologies. The wireless technologies employed can include near field communications (NFC), Bluetooth (BT), WiFi, as well as mobile phone technologies, such as WCDMA (Wideband Code Division Multiple Access), CDMA2000, UMTS (Universal Mobile Telecommunications System), GSM (Global System for Mobile communications), High Speed Packet Access (HSPA), and LTE (Long-Term Evolution, often referred to as 4G). In some implementations, the system 100 can also include various other wireless communication components, such as base stations (BS), additional APs, and wireless clients.

In the implementations, the wireless communication system 100 implements an OFDMA channelization as an aspect of the 802.11 WLAN. OFDMA is an access methods, or multiplexing technique, that can provide communications services to multiple users in a single-bandwidth wired or wireless medium. OFDMA can use multiple subcarriers within a single channel that can be transmitted to one or more receivers simultaneously. The techniques used in OFDMA can involve dividing a channel into multiple orthogonal bands that are spaced and transmitted in parallel, so as to reduce interference between the bands. The bands can be further divided into subcarriers. Different streams of information can be modulated, or mapped, onto subcarriers within the channel to communicate the information. Time slots within each subchannel data stream can be used to package the data to be transmitted. Thus, OFDMA techniques can be employed to accommodate multiple users in a given bandwidth.

In some OFDMA implementations, a group of subcarriers can be assigned to respective users or devices of the wireless network, for example. Each user can be further assigned to related time slots. It should be appreciated that, according to the implementations, OFDMA transmission using the combination of many subcarriers may enable data rates similar to conventional single-carrier modulation schemes within equivalent bandwidths.

Moreover, the wireless communication system 100 can be employed to perform TWT techniques utilized in 802.11 WLAN, for example. TWT can allow STAs to manage activity in the BSS by scheduling STAs 105, 110 to operate (e.g., transmit information) at different times. As an example, STA 105 can function as a TWT requesting STA, which requests a TWT agreement and STA 110 can be a TWT responding STA, which responds to the transmitted TWT request. Accordingly, based on the TWT agreement negotiated between the TWT requesting STA and TWT responding STA, STA 105 can be assigned a specific time to wake (e.g., power on wireless equipment), access the transmission media (e.g., channels) of the network 130, and exchange frames with STA 110. In some implementations, the TWT requesting STA or TWT responding STA can be AP 120. For example, AP 120 can communicate wake scheduling information to a TWT responding STA that subsequently determines TWT values used to establish a the TWT agreement. The TWT values can be communicated in a TWT element of a frame, which includes a set of fields dedicated to conveying, or otherwise indicating, certain information related to the TWT scheme. For instance, AP 120 can transmit a TWT element in an individually addressed TWT set-up frame with a value in a subfield indicating that the device is acting as a TWT requesting STA. In some implementations, AP 120 transmits TWT elements to STAs that are associated with the AP and/or STAs from which it received a frame containing a TWT element. Therefore, TWT techniques may minimize contention between wireless devices utilizing shared resources of the WLAN, and reduce the power associated with the required amount of time the device needs to be awake.

According to the implementations, various aspects of TWT schemes that can be employed by wireless communication system 100 are implemented with consideration of the operational and frame formatting requirements for interoperability with OFDMA transmission. Thus, the implementations realize OFDMA TWT techniques and mechanisms. In some implementations, OFDMA TWT techniques can be employed in an implicit TWT scheme, where the TWT requester and TWT responder negotiate the TWT service period (SP). Additionally, OFDMA TWT can be implemented in broadcast TWT, which can involve the AP broadcasting the TWT SP. For the broadcast TWT, in one implementation, the AP decides the start time, the service period of the broadcast TWT, and the interval of SPs and broadcast these items in Beacons transmitted by the AP.

Figure 2:
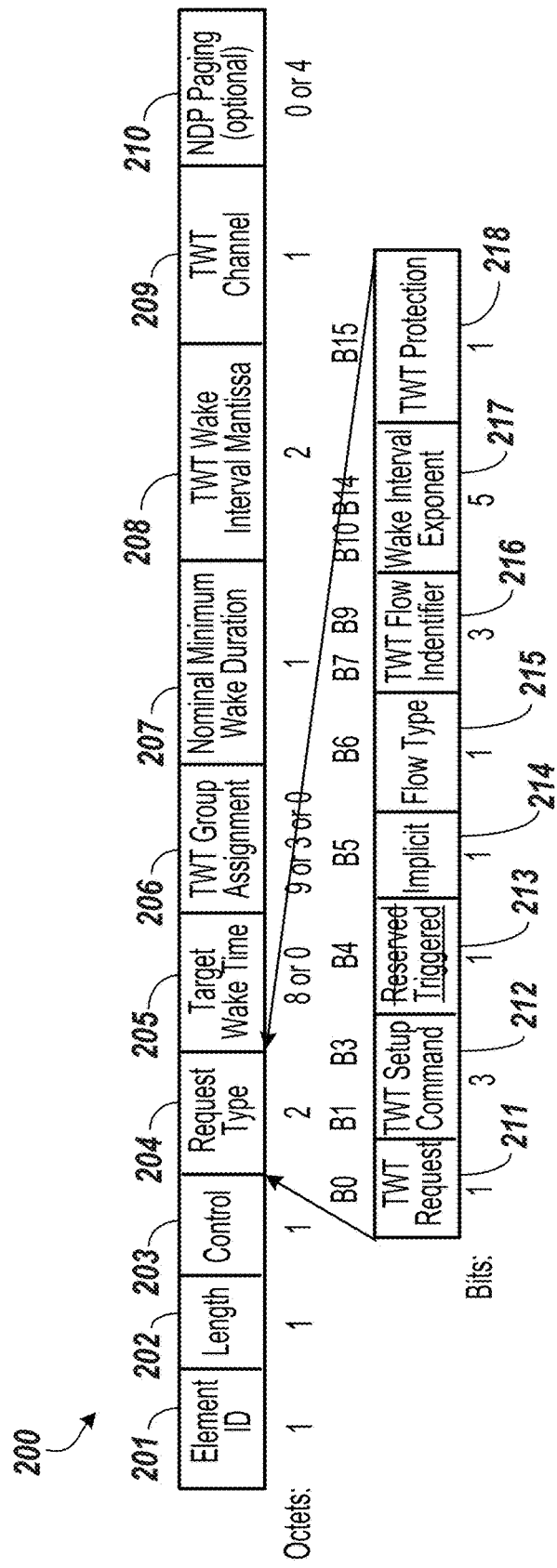
FIG. 2 shows an example of an OFDMA TWT element format.

FIG. 2 shows an example of an OFDMA TWT element format that can be employed in WLAN-based communication, according to the implementations. OFDMA TWT uses a predefined time that STAs wake up, namely the wake time, in order for the access to the channel to be staggered in a manner that can reduce channel contention. For instance, the AP can convey a specific time for individual STAs to access the medium. The AP can be employed to communicate the TWT values used in the scheme to each associated STA with the OFDMA TWT element 200 as illustrated in FIG. 2. The OFDMA TWT element 200 is exchanged between network devices via request and response frames, and are used to determine when and how often a station wakes up for downlink and/or uplink transmissions. As shown in FIG. 2, the OFDMA TWT element has a format that contains one or more fields including, but not limited to: element ID 201; length 202; control 203; request type 204; target wake time 205; TWT group assignment 206; nominal minimum wake duration 207; TWT wake interval mantissa 208; TWT channel 209; and null data packet (NDP) paging 210 (optional).

Additionally, the request type field 204 has a specified format used in some OFDMA TWT implementations, as shown in FIG. 2. The octets of the OFDMA TWT request type field 204 are expanded in FIG. 2 to show the bits and/or subfields that are contained therein, including: TWT request 211; TWT setup command 212; triggered 213; implicit 214; flow type 215; TWT flow identifier 216; wake interval exponent 217; and TWT protection 218.

The triggered subfield 213 is implemented within the octets allocated to the request type field 204. According to the implementations, the triggered subfield 213 can be employed to indicate that OFDMA transmission is being employed during the SP. For example, in the instance where the triggered subfield 213 is set to "1" in a TWT request, this can be used to request that a trigger frame to be transmitted at the start of a TWT according to OFDMA transmission mode techniques described in relation to FIG. 1, for example. Moreover, the triggered subfield 213 including a value of "1" in a TWT response can indicate that a trigger frame or an A-MPDU with Trigger frame will be scheduled at the start of the TWT. Thus, the triggered subfield 213 can effectuate a STA accessing a channel to perform transmission functions during the TWT SP, such as an uplink in OFDMA transmission mode. Alternatively, a triggered subfield 213 set to "0" can indicate that OFDMA is not being utilized, and the TWT element may not include the fields and/or subfields corresponding to OFDMA TWT implementations. In some existing WLAN standards, such transmission mode (e.g., OFDMA) indications are not included in the TWT element formats and a previously employed subfield, illustrated as " " in FIG. 2, includes the bits allocated to the triggered subfield 213 used in OFDMA TWT. Thus, the implementations realize a frame format for implementing TWT that considers and explicitly indicates OFDMA, and may increase integration with OFDMA channelization.

Figure 3A:
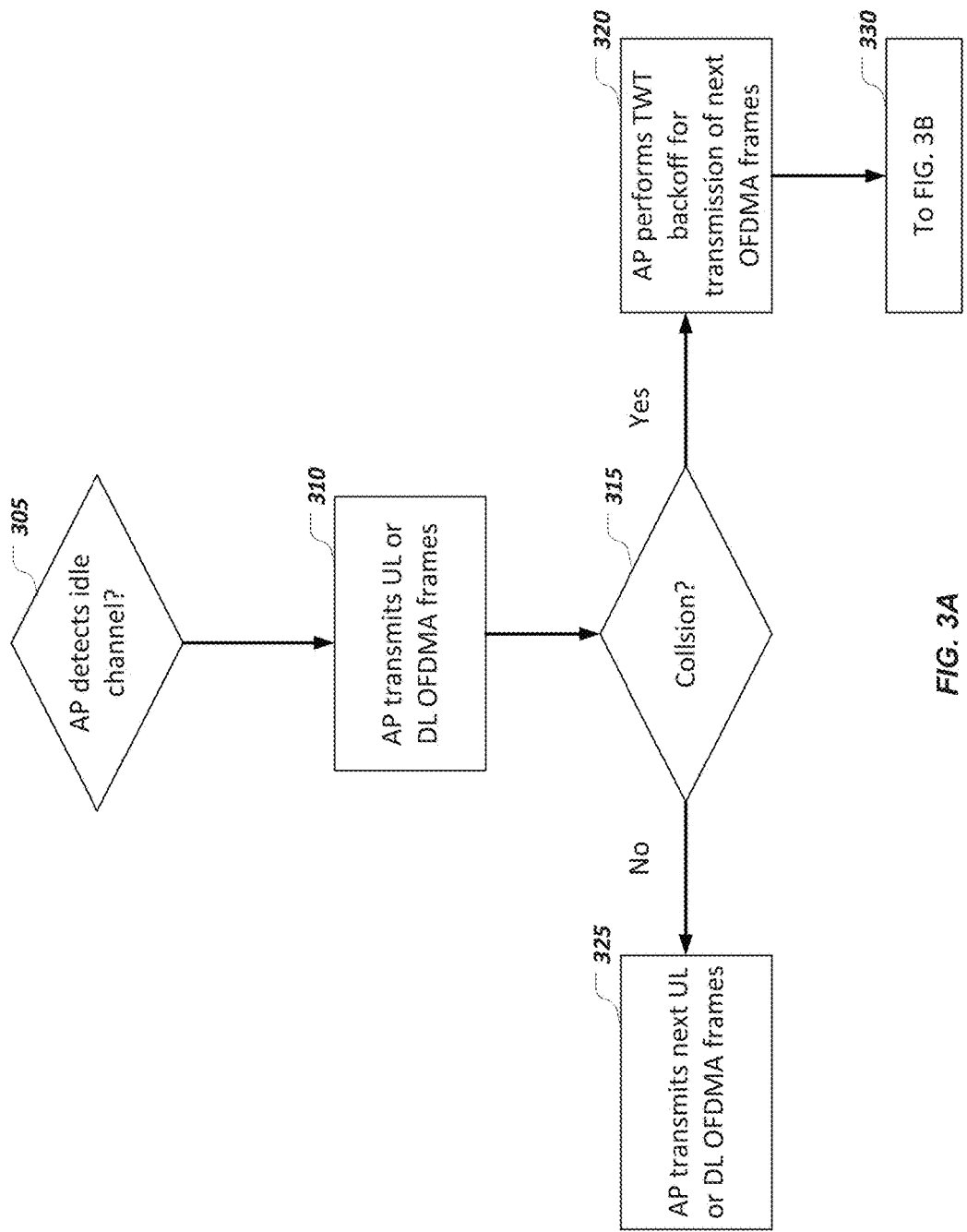

FIGS. 3A-3C illustrate an example of a process employed to implement medium access in the OFDMA TWT scheme. In some implementations, the process can be implemented as a transmission after PCF Interframe Space (PIFS) idle time. Accordingly, a PIFS spacing interval can be used by wireless networking devices (e.g., STAs and the AP) to contend for the medium, so as to reduce the potential of transmission collisions and get higher priority. STAs with data to transmit in the contention-free period can transmit after the PIFS has elapsed and pre-empt any contention-based traffic. In some implementations, 802.11 centered WLANs can include a primary 20 MHz channel and as a secondary adjacent channel spaced ±20 MHz away, for example. The primary channel can be used for communications with wireless devices that may be incapable of 40 MHz mode transmissions. Starting from the beginning of the OFDMA TWT SP, the AP can be employed for detection 305 of an idle channel. As an example, detecting can involve the network allocation vector (NAV) being set to "0" indicating that the primary channel (e.g., 20 MHz) is virtual idle and the physical sensing of the primary channel is physical idle. The AP can detect that the wireless medium has been idle during a PIFS period, thereby allowing the AP to occupy the channel after the PIFS time duration has elapsed. The AP can transmit 310 downlink (DL) or uplink (UL OFDMA frames upon detection of the idle channel. In some OFDMA TWT techniques, APs are configured to transmit frames first in the TWT SP. Consequently, according the OFDMA TWT medium access technique described, the AP has much more precedence to get into the actual channel. In one implementation, the AP can select EDCA backoff instead of PIFS idle to start the first MU transmission in a TWT SP. In the same implementation, the backoff procedure defined by FIG. 3B can be used.

As illustrated in FIG. 3A, the AP can access the medium fist, which can be associated with a OFDMA TWT medium access rule assigning a high priority to the AP to access the channel, as opposed to existing medium access procedures for TWT (as employed in 802.11ah). In 802.11ah standards, Enhanced Distribution Channel Access (EDCA) backoff is employed for implementing triggering frame restricted access windows (RAW), for example, since multiple STAs and APs can transmit frames in a TWT SP. Thus, in some existing TWT methods, STAs initially access the medium (e.g., multiple STAs transmit PS-Poll or Automatic Power Save Delivery (APSD) trigger frames) and the AP subsequently transmits DL frames in a TWT SP.

As shown in FIG. 3A, a check 315 can be employed to determine whether a collision has been experienced on the channel. For example, a collision can occur if a STA initiates transmission on the same channel during the DL transmission of the AP. In the instance where a collision has occurred, illustrated in FIG. 3A as "Yes", the AP can perform a TWT backoff process 320 to compete, or otherwise wait, for the channel so as to transmit the next OFDMA frames in the TWT SP. Thereafter, the TWT backoff process that has been initiated by the AP proceeds 330 to FIG. 3B. In some implementations, determining that a collision has occurred can include the AP failing to receive an acknowledgment associated with frames communicated during the DL. Other channel collision determination mechanisms and techniques applied in networking can be employed in the implementations, as deemed necessary and/or appropriate. Alternatively, if there is no collision on the channel, or "No" shown in FIG. 3A, the AP can maintain occupation of the channel and continue to transmit 325 the next UL or DL OFDMA frames.

FIG. 3B illustrates an example of a TWT backoff method employed in the OFDMA TWT medium access techniques of the implementations. To TWT initiate backoff, the AP can stop an EDCA backoff procedure and set the TWT backoff counter 335, thereby starting the TWT backoff procedure, at the beginning of the OFDMA TWT SP. Stopping the EDCA backoff can further include saving the EDCA backoff parameters that are associated with the first backoff state of EDCA backoff procedure. In some implementations, the AP can save values in EDCA backoff used for retransmission such as retry counters; the saved parameters can include, but are not limited to, backoff counters, contention windows (CW), short retry counter (QSRC) and long retry counter (QLRC), for example. As an example illustrated in FIG. 3C, operations of EDCA backoff can be suspended in its first state 372, after the beacon transmission 371 (e.g., start of the TWT SP), and the TWT backoff procedure is instead started 373 for OFDMA TWT. In some implementations, setting the TWT backoff counter can involve using a random value as the TWT contention window (TWTCW) in TWT backoff parameters, for example [1, TWTCW-1], wherein TWTCW is the $TWTCW_{min}$.

Thereafter, FIG. 3B shows that the TWT backoff counter, TWTCW, is decreased 340. Subsequently, a check 345 can be employed to determine whether the TWT backoff counter has reached zero, therefore indicating that the backoff time period corresponding the contention window has elapsed. In the instances where the TWT backoff counter has not expired (i.e., TWTCW=0), or "No", then the process can iteratively decreased the counter 340, until the value has been decremented to zero. Otherwise, if the TWT backoff counter has reached zero, illustrated in FIG. 3b as "Yes", then contention for access control of the medium is indicated as being resolved, and AP is allowed to access the channel. The AP can continue to transmit 350 DL or UL OFDMA frames via the channel. Furthermore, in some implementations, if the DL or UL transmission performed by the AP after backoff fails (e.g., collision), the AP can double the value for TWTCW until a ceiling value of $TWTCW_{max}$ is reached, so as to increase the time duration associated with the backoff. Then, after TWT backoff has ended, the EDCA backoff procedure can be recovered 355 by the AP. In some implementations, recovering the EDCA backoff process can include restoring the saved function state and resuming operation of the EDCA backoff. This is also illustrated in FIG. 3C, as an EDCA backoff procedure 374 is performed at the end of TWT backoff 373. FIG. 3C further shows that additional backoff procedures, TWT backoff 375 and EDCA backoff 376, can be completed prior to providing access to a channel for another beacon transmission 377. Subsequently, as shown in FIG. 3B, the AP can release TWT SP 360. CF-End can be employed for releasing the TWT SP, according to some implementations, where the AP recovers the EDCA backoff procedures and the EDCA backoff parameters once the AP transmits CF-end to release the TWT SP. Therefore, the implementations, as shown in FIGS. 3A-3C, implement medium access rules and techniques that are suitable for integration with OFDMA channelization (e.g., AP transmits frames first), where EDCA backoff mechanisms may realize less interoperability.

FIG. 4A shows an example of an OFDMA TWT element format. As illustrated in FIG. 4A, a format for TWT element 400 can include a request type field 410. For example, the request type 410 field that can be employed when TWT is not an OFDMA TWT as indicated by the OFDMA/trigger subfield 414 (i.e., OFDMA=0) can include multiple subfields, such as flow type 415 subfield. Flow type 415 can indicate the type of interaction between the TWT requesting STA and the TWT responding TWT. For example, a value of "0" in the flow type subfield can indicate an announced TWT, in which the requesting STA will send a PS-Poll or an APSD trigger frame. Furthermore, a value of "1" in the flow type 415 subfield indicates an unannounced TWT in which the TWT responding STA will send a frame to the TWT requesting STA at TWT without waiting to receive frames (e.g., PS-Poll or APSD trigger frames) from the TWT requesting STA, for example. However, in OFDMA transmission, an announced TWT, as indicated by flow type "0", may not be suitable for OFDMA TWT techniques, as it can be difficult for multiple STAs to transmit PS-Poll or APSD trigger frames, for instance, through EDCA backoff. Thus, the TWT OFDMA techniques may not perform announced TWT procedures, thereby trivializing the need for its indication in the TWT element. In some implementations, the TWT OFDMA techniques described can employ a TWT OFDMA element including the request type fields 420,425 that do not use the flow type 415 subfield. As illustrated, OFDMA TWT elements can employ request type 420, 425 formats that reuse bits corresponding to subfields that may not be needed in OFDMA based transmission, such as flow type 415, as a direction indication, such as uplink or downlink. As an example, UL subfield 431,435, indicating that the TWT is associated with uplink transmission, can replace the flow type 415 in OFDMA TWT elements. Additionally, DL subfields 430, 436, indicating that the TWT is associated with downlink transmission, can replace implicit subfields 416, 434 or TWT protection subfields 417,432, respectively. FIG. 4A shows an example request type 420 format for an OFDMA TWT element, including trigger/OFDMA subfield 429, DL subfield 430, UL subfield 431 and TWT protection subfield 432. Additionally, request type 425 format for an OFDMA TWT element, is illustrated in FIG. 4A to include trigger/OFDMA subfield 433, implicit subfield 434, UL subfield 435, and DL subfield 436. Consequently, OFDMA TWT elements can use direction indication to allow APs to perform direction based grouping, for example grouping STAs with DL requirements, and similarly STAs with UL requirements, together. Thus, the direction indication mechanisms of the implementations can realize traffic aggregation for OFDMA transmission, thereby increasing the efficiency and transmission and channel usage.

Alternatively, in some implementations, OFDMA TWT can implement announced TWT, therefore TWT requesting STAs can send PS-Poll or ASPD trigger frames, and the flow type subfield 415 is utilized (e.g., flow type is set to "0").

Accordingly, in implementations involving "0" flow type indicated in OFDMA TWT elements, the AP can be configured to use contention OFDMA to handle multiple STA transmissions. Contention OFDMA can include polling an availability of an STA. Thereafter the STAs can respond with a short PS-Poll frame 450, as shown in FIG. 4B. FIG. 4B shows an example of a short PS-Poll frame 450 that can be employed in announced OFDMA TWT. Short PS-Poll frame 450 can have a format that is comparatively shorter (e.g., 8 octets) than some existing PS-Poll frames (e.g., 20 octets) used in TWT mechanisms. Short PS-Poll frame 450 can include fields associated with IEEE 802.11 Media Access Control (MAC) frames, such as control field 451, Association Identifier (AID) field 452, and FCS field 453. Therefore, the short PS-Poll frame 450 can have a format that removes fields that may not be necessitated by OFDMA TWT specific functions. For example, two MAC addresses (e.g., the address of the STA transmitting the frame) used in some existing PS-Poll frames and the MAC Protocol Data Unit (MPDU) delimiter are not included in the short PS-Poll frame 450 format. Furthermore, the receiver of an OFDMA PS-Poll typically knows the exact length of the control frame, according to the implementations. Although the flow type subfield is used in this implementation, the short PS-Poll frame 450 can reduce the frame size and the amount of data transmitted as multiple STAs communicate frames in announced TWT schemes, thereby decreasing the potential of channel contention and increasing the suitability for its use in OFDMA TWT.

Figure 5:
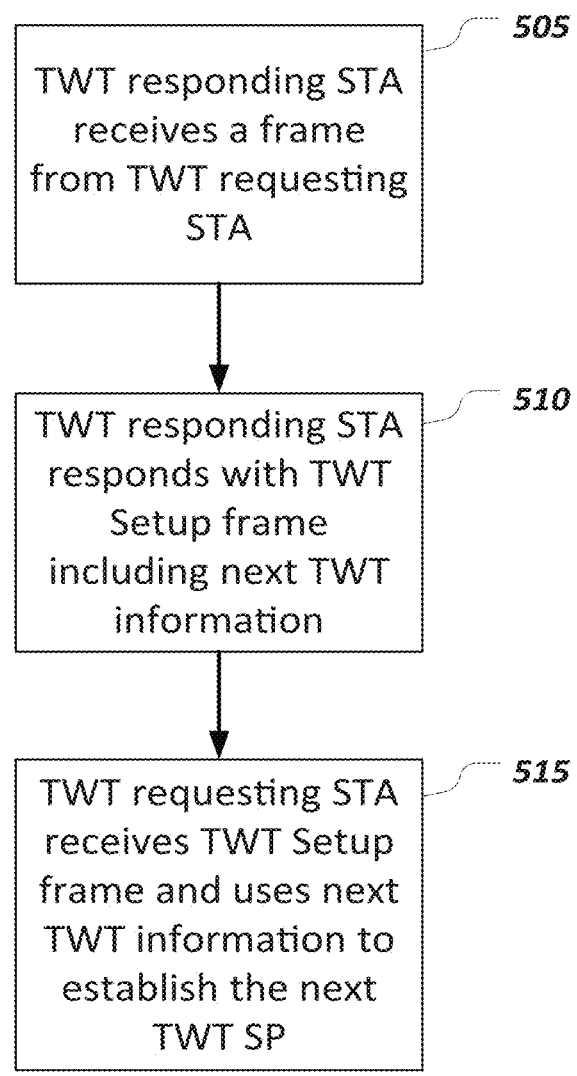
FIG. 5 shows an example process employed for OFDMA TWT renegotiation for successive TWT SPs.

FIG. 5 shows an example process employed for OFDMA TWT renegotiation of successive TWT SPs. Communicating setup information to a STA for a subsequent TWT SP, as utilized in some existing TWT procedures (e.g., implicit TWT schemes), can involve using acknowledgment frames. As an example, implicit TWT can employ block acknowledgment TWT (BAT), short TWT acknowledgement (STACK), and TWT acknowledgement (TACK) frames containing a Next TWT Info/Suspend Duration field for renegotiating future TWT SP information between a TWT requesting STA and a TWT responding STA. However, acknowledgment frames can be susceptible to loss and/or damage, and therefore may not be adequate for transmitting critical TWT information. As an example, a STA can fail to receive the next TWT SP information, if a BAT/TACK/STACK is not received (e.g., collision) and/or corrupted (e.g., channel noise). In contrast, the OFDMA TWT techniques described can employ an OFDMA TWT renegotiation scheme using a TWT Setup management frame, rather than an acknowledgment frame. In FIG. 5, the OFDMA TWT renegotiation process includes a TWT responding STA receiving a frame 505 from a TWT requesting STA with which it has established a previous TWT agreement. In some implementations, the TWT responding STA can be an AP. Then, the TWT responding STA can respond to the STA with a TWT Setup frame 510 that includes information pertaining to the next TWT SP. The TWT Setup frame transmitted by the TWT responding STA can include an OFDMA TWT element containing information corresponding to the next TWT. In the implementations, the TWT Setup frame can be transmitted by the TWT responding STA during a TWT SP duration. For instance, a value set in the target wake time field communicated via the TWT Setup frame can be set to a time corresponding to the next TWT SP. According to the implementations, any values, information, fields, action fields, indications, or combination thereof, included in the TWT Setup frame can be used to represent next TWT information, which could otherwise be communicated in the Next TWT Info/Suspend Duration field of BAT/TACK/STACK, can be employed as suitable or necessary.

Subsequently, the TWT requesting STA can receive the TWT Setup frame 515, and use the Target Wakeup Time and the TWT Wakeup Interval in order to establish the next, or a successive, TWT SP. The TWT requesting STA can be required to be awake during the TWT SP. In some implementations, using the Target Wakeup Time can involve the TWT requesting STA utilizing the Target Wakeup Time included in the received TWT Setup frame as the TST time value for the start of the next TWT. Additional successive TWT SP, or sets of TWT SPs, associated with same TWT agreement of the responding and requesting STAs can be calculated based on adding the value of TWT wake interval associated with the TWT SP to the current TWT. OFDMA TWT renegotiation as described can implement a technique that increases the reliability of communicating TWT information (e.g., start time) for future TWT SPs. The reason is that for the renegotiation TWT SP, the TWT Request frame and TWT Response frame are acknowledged by the following Ack frame. In some existing TWT renegotiation schemes using BAT/TACK/STACK mechanisms, the lower MAC can process BAT/TACK/STACK frames as new control frames that effectuate changes in the lower MAC layer (e.g., hardware change). Accordingly, when BAT/TACK/STACK mechanisms are used the BAT/TACK/STACK frames can get lost, the transmitter and the receiver of BAT/TACK/STACK may have a different view of the next TWT SP.

Figure 6:
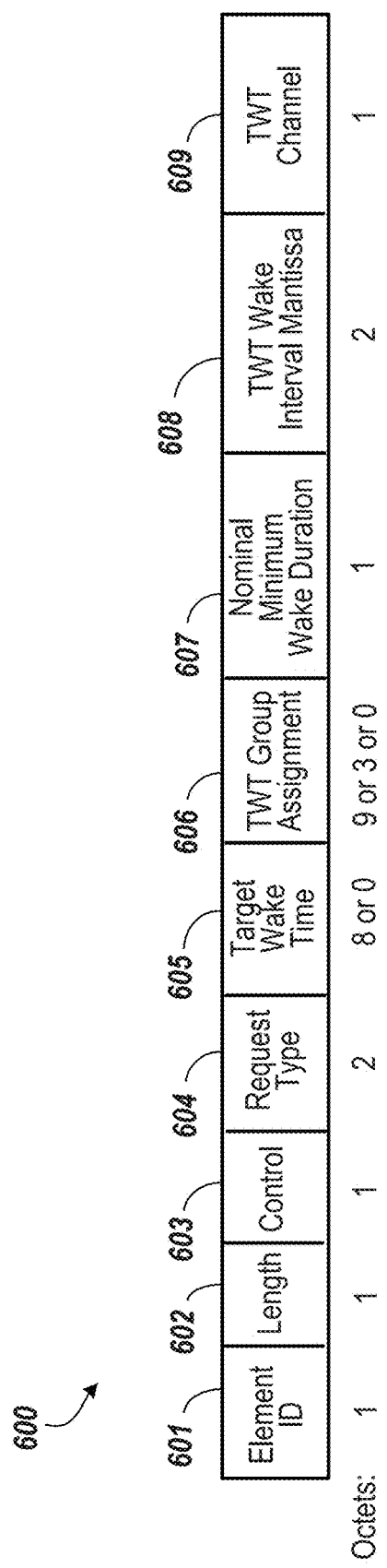
FIG. 6 shows an example of another OFDMA TWT element format.

In some implementations, OFDMA TWT employs a technique that can disallow use of a temporary primary channel. Therefore, the byte allocated for a TWT channel field included in TWT element formats employed in some WLAN standards, such as 802.11ah, can be altered and used as a TWT duration indication in OFDMA TWT. As shown in FIG. 6, an OFDMA TWT element 600 format can include fields: element ID 601, length 602; control 603; request type 604; target wake time 605; TWT group assignment 606; nominal minimum wake duration 607; and TWT wake interval mantissa 608. Moreover, the OFDMA TWT element 600 can replace the TWT channel field previously employed for indicating which channel will be used as a temporary primary channel during a TWT SP, with a TWT duration field 609. The OFDMA TWT element 600 is configured so as to not include information relating to the primary channel, as the STA which has a temporary primary channel does not have NAV information of the temporary primary channel (e.g., at the beginning of the TWT SP) which can complicate medium access (e.g., ignore NAV or wait until the STA established a NAV) therefore may not be suitable for integration in OFDMA TWT schemes. Also, the STA which has a temporary primary channel does not have the NAV information of the BSS primary channel (e.g., at the end of the TWT SP), which can further complicate medium access. The OFDMA TWT element illustrated in FIG. 6 repurposes information that may not be relevant and/or suitable for the implementations in favor of including information (e.g., TWT duration) that can be integral or improve OFDMA TWT functions. For example, the TWT channel fields in some existing TWT element formats can contain a bitmap indicating which channel the STA requests to use as a temporary primary channel. Thus, information related to the temporary primary channel mechanism, deemed unsuitable for use in OFDMA TWT can be removed and/or redefined as a TWT duration field 609 that indicates the medium time used for OFDMA transmission in predefined bandwidth (e.g., 20 Mhz) or BSS operational channel bandwidth. The OFDMA TWT duration can be used to implement aggregation of STAs with similar TWT duration requirements in a shared TWT SP, and thereby can improve, or otherwise optimize, the performance of OFDMA TWT techniques.

Figure 7:
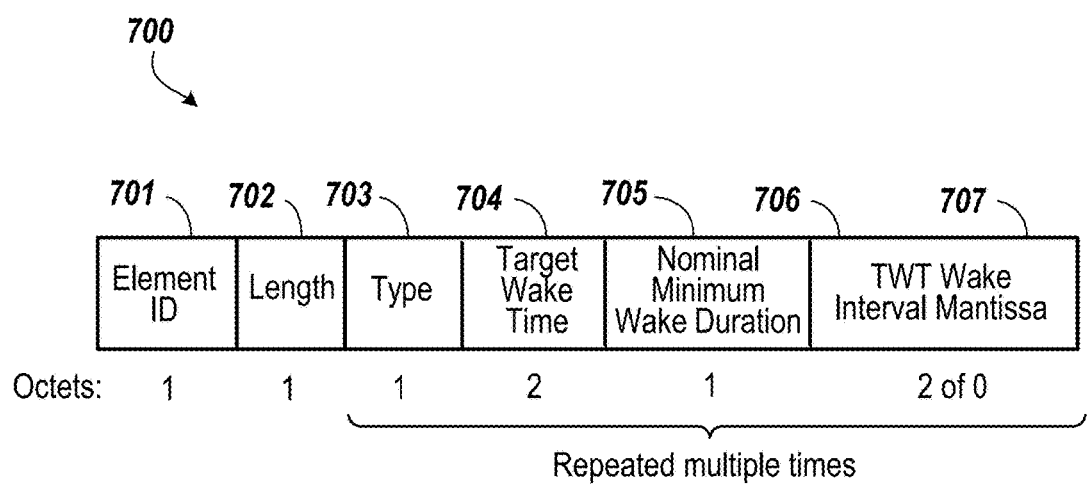
FIG. 7 shows an example of a Broadcast TWT Set element format.

In some implementations, the TWT OFDMA employs a broadcast scheme, in addition to the implicit scheme as discussed in relation to FIG. 2, for example. According to broadcast OFDMA TWT implementations, a beacon signal is used for an AP to explicitly announce a TWT SP, via transmitting a TWT element, and without negotiation with STAs. As shown in FIG. 7, the implementations utilize a broadcast TWT Set element that is defined, or otherwise formatted, to include multiple OFDMA TWT elements 700 in a broadcast. For example, a broadcast TWT Set element 700 includes: element ID 701; length 702; type 703; target wake time 704; nominal minimum wake duration 705; and TWT wake interval mantissa 706. The type field 703, as illustrated in FIG. 7, can be allocated an octet, including various subfields, employed for representing broadcast TWT information. For example, the type field can include: a DL subfield (1 bit) to indicate whether the TWT SP allows DL OFDMA transmission; a UL subfield (1 bit) to indicate whether the TWT SP allows UL OFDMA transmission; a contention subfield (1 bit), as an indication of whether contention UL OFDMA is allowed in the TWT SP; and a repeat subfield (3 bits) which indicates the number of repeated TWT SP minus 1. Additionally, 2 bits of the type field 703 are reserved. Moreover, the target wake time field 704 of the TWT Set element 700 can be used to indicate the interval between the beacon and the start time of the first broadcast TWT SP starts in the beacon interval (BI). In some implementations, this field is not needed if TWT Wake Interval field 706 also indicates the start time of the first TWT SP. Nominal minimal wake duration field 705 can be configured to include the duration of the broadcast TWT SP. The TWT wake interval mantissa field 706 can indicate the interval between two adjacent TWT SPs. In the instance where the repeat subfield is set to 0, the TWT wake interval mantissa field 706 is not included in the broadcast TWT, thereby reducing the size of the element 700. The TWT Set element 700 is formatted in accordance with the OFDMA TWT broadcast scheme, and thus provides space to repeat fields 703, 704, 705, and 706 for multiple TWTs. This can save the transmission time of Beacon since the Element ID, Element Length are shared by multiple repeat fields 703, 704, 705, 706. In some implementations, each individual broadcast TWT included in the Broadcast TWT Set element 700 at least includes required fields 703, 704, 705, and 706.

In one implementation, some information represented in existing TWT element formats, such as control field, request type, target wake time, and TWT channel, are deemed unsuitable for use in broadcast OFDMA TWT. As an example, a broadcast TWT SP is always in BI following the beacon which carries broadcast TWT information, and thus 8 octets allocated for a target wake time field, as used in some existing formats, is not necessitated in the OFDMA TWT broadcast environment according to some implementations. Therefore the target wake time field 704, for example, can be reduced in the broadcast TWT Set 700 to save the Beacon transmit time. Furthermore, the Broadcast TWT Set element 700 can be used to implement further power save in which the STA that is not a broadcast TWT participant can go to sleep during the broadcast TWT, and thereby can increase power saving capabilities of TWT techniques. In another implementation, an AP can announce a broadcast TWT which covers the negotiated TWT SP. The STAs which are not TWT requester/responder of the negotiated TWT can go to sleep during the broadcast TWT. In some implementations, a STA associated with an AP can be excluded, or otherwise prevented, from transmitting frames during a TWT SP that is defined in the beacon transmitted by the AP.

In one implementation, the Target Wake Time 704 is defined as TSF[4:20] value when the broadcast TWT SP starts and the TSF[0:3] are 0. In another implementation, the Target Wake Time 704 is defined as the time difference between the target Beacon transmit time (TBTT) of the Beacon which includes the broadcast TWT element and the start time of broadcast TWT SP in unit of 1 microsecond. With unit of 1 microsecond, the first broadcast TWT SP can be 65536 microseconds away from the TBTT of Beacon. Other time units, e.g., unit of 2 microseconds are also possible. In yet another implementation, the Target Wake Time 704 is defined as the time difference between the TSF time of the Beacon and the start time of broadcast TWT SP in unit of microsecond.

For example, a TWT SP can be defined, or otherwise indicated, in a beacon signal transmitted by the AP. According to the implementations, the beacon signal can be employed to transmit the Broadcast TWT Set element 700. Subsequently a STA can transition to a sleep power mode (e.g., power off) during the TWT SP, provided that the STA is not one of the receivers of the broadcast TWT, the TWT requester of the implicit TWT which is covered by the broadcast TWT, or the TWT responder of the implicit TWT which is covered by the broadcast TWT. In the sleep state, components related to wireless communication, for example a transceiver, can be turned off and the wireless interface may not detect or sense the behavior of the network. Therefore, the implementations can realize additional power saving modes for STAs that can improve the efficiency of wireless devices employing TWT techniques.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method of operating a wireless device, the method comprising:
    receiving a frame at the wireless device, wherein a format of the frame comprises
        (i) a field indicating a target wake time (TWT),
        (ii) a first subfield having a first value that indicates a digital modulation channelization scheme, and
        (iii) a second subfield having a second value that indicates a transmission direction, wherein the second subfield uses one or more bits corresponding to one or more subfields that are not needed in TWT scheduling for transmissions that employ the digital modulation channelization scheme; and
    powering on the wireless device at the target wake time indicated by the field in the frame, wherein the powering on the wireless device enables the wireless device to transmit additional frames via a wireless channel based on (i) the first value set in the first subfield of the frame and (ii) the second value set in the second subfield of the frame.

2. The method of claim 1, wherein the first value set in the first subfield corresponds to Orthogonal Frequency Division Multiple Access (OFDMA) digital modulation channelization, and powering on the wireless device further enables the wireless device to transmit the additional frames according to an OFDMA access scheme.

3. The method of claim 1, wherein the second value set in the second subfield corresponds to an uplink transmission, and powering on the wireless device further enables the wireless device to transmit the additional frames in an uplink transmission.

4. The method of claim 1, wherein the second value set in the second subfield corresponds to a downlink transmission, and powering on the wireless device further enables the wireless device to transmit the additional frames in a downlink transmission.

5. The method of claim 1, wherein the format of the frame comprises a third subfield indicating flow type, and the wireless device transmits a short Power Save (PS)-Poll frame in response to the received frame.

6. The method of claim 1, wherein the wireless device is a wireless station (STA).

7. The method of claim 6, wherein the STA is connected to an access point (AP) via a wireless network.

8. The method of claim 1, wherein the format of the frame comprises a third subfield indicating a TWT duration.

9. The method of claim 1, comprising aggregating the frame with one or more additional frames based the second subfield.

10. A wireless communication device comprising:
    one or more antennas;
    transceiver electronics; and
    processor electronics programmed to:
        detect, subsequent to a point coordination function (PCF) interframe space (PFS) and at a start of a target wait time service period (TWT SP) prior to a contention period, whether a wireless channel is idle;
        upon detecting that the wireless channel is idle, transmit one or more frames via the wireless channel using the one or more antennas and the transceiver electronics;
        determine whether a collision has occurred during transmitting on the wireless channel; and
        upon determining that the collision has occurred, suspend operation of a first backoff procedure at a starting state and initiating a counter for a second backoff procedure.

11. The wireless communication device of claim 10, wherein the first backoff procedure is an Enhanced Distribution Channel Access (EDCA) backoff procedure and the second backoff procedure is a TWT back off procedure.

12. The wireless communication device of claim 10, wherein the wireless communication device is an access point (AP).

13. The wireless communication device of claim 10, wherein the processor electronics are further programmed to transmit a setup management frame with a format comprising one or more fields indicating TWT information, wherein the setup management frame is usable by a second wireless device to establish a next TWT SP.

14. The wireless communication device of claim 13, wherein the TWT information is a TWT corresponding to the next TWT SP.

15. A wireless communication device, comprising:
    one or more antennas;
    transceiver electronics; and
    processor electronics programmed to:
        detect, at a start of a target wait time service period (TWT SP), whether a wireless channel is idle;
        upon detecting that the wireless channel is idle, transmit one or more frames via the wireless channel using the one or more antennas and the transceiver electronics;
        determine whether a collision has occurred during transmitting on the wireless channel; and upon determining that the collision has occurred, suspend operation of a first backoff procedure at a starting state and initiating a counter for a second backoff procedure, wherein the suspending the operation of the first backoff procedure comprises storing one or more values associated with the first backoff procedure associated with the starting state.

16. A wireless communication device, comprising:
one or more antennas;
transceiver electronics; and
processor electronics programmed to:
    detect, at a start of a target wait time service period (TWT SP), whether a wireless channel is idle;
    upon detecting that the wireless channel is idle, transmit one or more frames via the wireless channel using the one or more antennas and the transceiver electronics;
    determine whether a collision has occurred during transmitting on the wireless channel; and
    upon determining that the collision has occurred, suspend operation of a first backoff procedure at a starting state and initiating a counter for a second backoff procedure,
wherein the processor electronics are further programmed to: determine whether the counter for the second backoff procedure is equal to zero; and upon detecting that the counter for the second backoff procedure is equal to zero, transmit one or more additional frames via the wireless channel.

17. A system comprising:
a wireless local area network (WLAN);
at least one wireless station (STAB) communicatively coupled with the WLAN; and
an access point (AP) communicatively coupled with the WLAN and programmed to transmit a frame via a broadcast signal to the at least one STA, wherein a format of the frame comprises a first field indicating a target wake time (TWT), a second field indicating a downlink transmission, a third field, separate from the second field, indicating an uplink transmission; a fourth field indicating contention; and a fifth field indicating a number of repeated TWT service periods (SP).

18. The system of claim 17, wherein the access point is further programmed to transmit an additional frame via the WLAN, wherein an additional format of the additional frame comprises a first subfield indicating Orthogonal Frequency-Division Multiple Access (OFDMA) digital modulation channelization, and a second subfield indicating a transmission direction.

19. The system of claim 18, wherein the additional format of the additional frame comprises a third subfield indicating a TWT duration.

20. The system of claim 17, wherein the at least one STA is programmed to: (i) power on at the TWT indicated in first field of the frame; and (ii) transmit via the WLAN based on each the second field, third field, fourth field, and fifth field of the transmitted frame.

\* \* \* \* \*